United States Patent
Riva et al.

(10) Patent No.: US 9,736,166 B2
(45) Date of Patent: Aug. 15, 2017

(54) SYSTEM AND METHOD FOR USING PER-APPLICATION PROFILES IN A COMPUTING DEVICE

(71) Applicant: Microsoft Technology Licensing, LLC, Redmond, OR (US)

(72) Inventors: Oriana Riva, Redmond, WA (US); Suman Kumar Nath, Redmond, WA (US); Temitope Oluwafemi, Seattle, WA (US); Franziska Roesner, Seattle, WA (US); Tadayoshi Kohno, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/733,859

(22) Filed: Jun. 8, 2015

(65) Prior Publication Data

US 2016/0359862 A1  Dec. 8, 2016

(51) Int. Cl.
*G06F 21/00* (2013.01)
*H04L 29/06* (2006.01)
(Continued)

(52) U.S. Cl.
CPC .......... *H04L 63/102* (2013.01); *G06F 21/126* (2013.01); *G06F 21/629* (2013.01);
(Continued)

(58) Field of Classification Search
None
See application file for complete search history.

(56) References Cited

U.S. PATENT DOCUMENTS

| 8,695,060 B2 | 4/2014 | Wade et al. |
| 8,726,390 B1 | 5/2014 | Martini |

(Continued)

FOREIGN PATENT DOCUMENTS

| EP | 2 544 089 | 1/2013 |
| EP | 2 629 478 | 8/2013 |

OTHER PUBLICATIONS

Amadeo, Ron, "Arstechnica. Android 5.0 Lollipop, thoroughly reviewed", Published on: Nov. 12, 2014. Available at: http://arstechnica.com/gadgets/2014/11/android-5-0-lollipop-thoroughly-reviewed/7/.

(Continued)

*Primary Examiner* — Hadi Armouche
*Assistant Examiner* — Andrew Steinle
(74) *Attorney, Agent, or Firm* — Klarquist Sparkman, LLP

(57) ABSTRACT

Systems and methods for creating and managing per-application profiles are disclosed. A method may include receiving input designating at least a first profile policy and a second profile policy. At least a first application profile and a second application profile may be created based on the received first profile policy and the second profile policy. An application of the plurality of applications may be associated with both the first application profile and the second application profile. A first storage partition and a second storage partition may be created within a storage space of the computing device. The storage space may be associated with the application. The first storage partition may store application data while the application is running under the first application profile. The second storage partition may store application data while the application is running under the second application profile.

19 Claims, 11 Drawing Sheets

(51) Int. Cl.
G06F 21/12 (2013.01)
G06F 21/62 (2013.01)
H04W 12/08 (2009.01)

(52) U.S. Cl.
CPC ...... *G06F 21/6218* (2013.01); *G06F 21/6281* (2013.01); *H04W 12/08* (2013.01); *G06F 2221/2143* (2013.01)

(56) References Cited

U.S. PATENT DOCUMENTS

| | | | | |
|---|---|---|---|---|
| 2007/0226736 | A1* | 9/2007 | Johnson | G06F 9/45533 718/1 |
| 2010/0319053 | A1 | 12/2010 | Gharabally | |
| 2012/0036552 | A1* | 2/2012 | Dare | H04L 41/0253 726/1 |
| 2012/0297387 | A1 | 11/2012 | Croft et al. | |
| 2012/0303476 | A1* | 11/2012 | Krzyzanowski | G06F 8/60 705/26.5 |
| 2014/0007183 | A1 | 1/2014 | Qureshi et al. | |
| 2014/0066020 | A1* | 3/2014 | Sadhvani | H04M 1/24 455/411 |
| 2014/0082059 | A1 | 3/2014 | Das et al. | |
| 2014/0109178 | A1 | 4/2014 | Barton et al. | |
| 2014/0122623 | A1* | 5/2014 | Nerieri | H04L 67/306 709/206 |
| 2015/0207800 | A1* | 7/2015 | Jitkoff | H04L 63/102 726/4 |

OTHER PUBLICATIONS

"Android—AppBrain Stats", Retrieved on: Mar. 29, 2015 Available at: http://www.appbrain.com/stats/.
"Android for Work", Retrieved on: May 21, 2015 Available at: https://www.android.com/intl/en_us/work/.
"Android for Work—Security white paper", Google for Work—Android Last updated: May 2015, Available at: https://static.googleusercontent.com/media/www.google.com/en/US/work/android/files/android-for-security-white-paper.pdf.
"Android Lollipop", Retrieved on: Mar. 29, 2015 Available at: http://developer.android.com/about/versions/lollipop.html.
"Android Official Blog", Retrieved on: Mar. 29, 2015 Available at: http://officialandroid.blogspot.in/.
"Android Work", Published on: Jun. 25, 2014 Available at: https://www.youtube.com/watch?v=FbVWtYPpzIs&feature=youtu.be.
Andrus, et al., "Cells: A Virtual Mobile Smartphone Architecture", In Proceedings of the Twenty-Third ACM Symposium on Operating Systems Principles, Oct. 23, 2011, pp. 173-187.
Barr, et al., "The VMware Mobile Virtualization Platform: Is That a Hypervisor in Your Pocket?", In Newsletter of ACM SIGOPS Operating Systems Review, vol. 44, Issue 4, Dec. 2010, pp. 124-135.
Bugiel, et al., "Practical and Lightweight Domain Isolation on Android", In Proceedings of the 1st ACM workshop on Security and privacy in smartphones and mobile devices, Oct. 17, 2011, 12 pages.
Bugiel, et al., "XManDroid: A New Android Evolution to Mitigate Privilege Escalation Attacks", In Technical Report TR-2011-04, Apr. 2011, 18 pages.
"BYOD Use Cases", Retrieved on: Mar. 26, 2015. Available at: http://www.cisco.com/c/dam/en/us/td/docs/solutions/Enterprise/Borderless_Networks/Unified_Access/BYOD_Use_Cases.pdf.
"Cryptology ePrint Archive", Retrieved on: Mar. 29, 2015. Available at: http://eprint.iacr.org/.
Davi, et al., "Privilege Escalation Attacks on Android", In Proceedings of the 13th International Conference on Information Security, Oct. 25, 2010, 15 pages.
"Divide", Published on: Jul. 12, 2014, Available at: https://play.google.com/store/apps/details?id=com.enterproid.divideinstaller&hl=en.
"Divide", Retrieved on: Mar. 29, 2015, Available at: http://www.divide.com/.
Enck, et al., "TaintDroid: An Information-Flow Tracking System for Realtime Privacy Monitoring on Smartphones", In 9th USENIX Symposium on Operating Systems Design and Implementation, Oct. 4, 2010, 15 pages.
Faas, Ryan, "What Businesses Need to Know About Android Work", Published on: Jul. 8, 2014, Available at: http://www.citeworld.com/article/2451667/mobile-byod/android-work-in-depth.html.
Felt, et al., "Permission Re-delegation: Attacks and Defenses", In Proceedings of the 20th USENIX conference on Security, Aug. 11, 2011, 16 pages.
Garfinkel, et al., "Terra: A Virtual Machine-Based Platform for Trusted Computing", In Proceedings of the nineteenth ACM symposium on Operating systems principles, Oct. 19, 2003, 14 pages.
"Gartner Predicts by 2017, Half of Employers will Require Employees to Supply Their Own Device for Work Purposes", Published on: May 1, 2013, Available at: http://www.gartner.com/newsroom/id/2466615.
"Google for Work—Android", Retrieved on: May 21, 2015 Available at https://www.google.com/work/android.
Hachman, Mark, "Google's New Android for Work Locks Down Business Data on Your Personal Phone", Published on: Feb. 25, 2015, Available at: http://www.pcworld.com/article/2888787/googles-new-android-for-work-locks-down-business-data-on-your-personal-phone.html.
Hao, et al., "PUMA: Programmable UI—Automation for Large Scale Dynamic Analysis of Mobile Apps", In Proceedings of the 12th Annual International Conference on Mobile Systems, Applications, and Services, Jun. 2, 2014, pp. 1-14.
Hill, Kelly, "BYOD grows, stirs privacy concerns", Published on: Sep. 28, 2012, Available at: http://www.rcrwireless.com/20120928/wireless/byod-grows-privacy-concerns.
Hoffman, Chris, "Share Your Android Tablet (and Keep Your Privacy) with a Guest Account", Published on: Aug. 13, 2013, Available at: http://www.howtogeek.com/170191/share-your-android-tablet-and-keep-your-privacy-with-a-guest-account/.
Hornyack, et al., "These Aren't the Droids You're Looking for: Retrofitting Android to Protect Data from Imperious Applications", In Proceedings of the 18th ACM Conference on Computer and Communications Security, Oct. 17, 2011, pp. 1-12.
"IBM MobileFirst Platform Foundation", Retrieved on: Mar. 29, 2015 Available at: http://www-03.ibm.com/software/products/en/mobilefirstfoundation.
Kaneshige, Tom, "BYOD: Time to Adjust Your Privacy Expectations", Published on: May 30, 2012, Available at: http://www.cio.com/article/2395604/byod/byod--time-to-adjust-your-privacy-expectations.html.
Lange, et al., "L4Android: A Generic Operating System Framework for Secure Smartphones", In Proceedings of the 1st ACM Workshop on Security and Privacy in Smartphones and Mobile Devices, Oct. 17, 2011, 12 pages.
"Leveraging Bring Your Own Device Programs", In White Paper, Published on: Nov. 29, 2013, Available at: http://www.centerprise.co.uk/partners/alcatel-lucent/assets/E2013092444EN_BYOD_EN_AppNote.pdf.
Mark, Dave, "On Multi-User Access to Your IOS Device", Published on: Jan. 19, 2015, Available at: http://www.loopinsight.com/2015/01/19/on-multi-user-access-to-your-ios-device/.
Mathiason, et al., "The "Bring Your Own Device" to Work Movement", Published on: May 10, 2012, Available at: http://www.littler.com/publication-press/publication/bring-your-own-device-work-movement.
McCune, et al., "Flicker: An Execution Infrastructure for TCB Minimization", In Proceedings of the 3rd ACM SIGOPS/EuroSys European Conference on Computer Systems, Apr. 2008, 14 pages.
McCune, et al., "TrustVisor: Ecient TCB Reduction and Attestation", In Proceedings of the IEEE Symposium on Security and Privacy, May 16, 2010, 17 pages.
McNickle, Michelle, "BYOD Security Tops Doctors' Mobile Device Worries", Published on: Oct. 31, 2012, Available at: http://

(56) References Cited

OTHER PUBLICATIONS www.informationweek.com/mobile/byod-security-tops-doctors-mobile-device-worries/d/d-id/1107153.
"Meet Evolving Enterprise Mobility Challenges with Samsung KNOX", In White Paper, Published on: Feb. 27, 2014, 12 pages.
Miller, et al., "BYOD: Security and Privacy Considerations", In Journal of IT Professional, vol. 14, Issue 5, Sep. 2012, pp. 53-55.
"OK:Android", Retrieved on: Mar. 29, 2015, Available at: http://www.ok-labs.com/products/ok-android/.
Owusu, et al., "ACCessory: Password Inference using Accelerometers on Smartphones", In Proceedings of the Twelfth Workshop on Mobile Computing Systems & Applications, Feb. 28, 2012, 6 pages.
Raj, Karthik, "Bring Your Own Device (Byod)—Considerations for Adoption and Implementation", In White Paper, Jan. 22, 2014, 12 pages.
Roesner, et al., "Securing Embedded User Interfaces: Android and Beyond", In Proceedings of the 22nd USENIX Conference on Security, Aug. 14, 2013, pp. 1-15.
Russello, et al., "DEMO: Demonstrating the Effectiveness of MOSES for Separation of Execution Modes", In Proceedings of the ACM Conference on Computer and Communications Security, Oct. 16, 2012, 3 pages.
Russello, et al., "MOSES: Supporting Operation Modes on Smartphones", In Proceedings of the 17th ACM Symposium on Access Control Models and Technologies, Jun. 20, 2012, 10 pages.

Santos, et al., "Trusted Language Runtime (TLR): Enabling Trusted Applications on Smartphones", In Proceedings of the 12th Workshop on Mobile Computing Systems and Applications, Mar. 1, 2011, 6 pages.
Santos, et al., "Using ARM TrustZone to Build a Trusted Language Runtime for Mobile Applications", In Proceedings of the 19th International Conference on Architectural Support for Programming Languages and Operating Systems, Mar. 1, 2014, 14 pages.
Schlegel, et al., "Soundcomber: A Stealthy and Context-AwareSound Trojan for Smartphones", In Proceedings of the 18th Annual Network & Distributed System Security Symposium, Feb. 2011, 17 pages.
"Support Personal Devices in Your Enterprise Deployment", Retrieved on: Mar. 26, 2015, Available at: http://www.air-watch.com/solutions/bring-your-own-device-byod/.
Xu, et al., "Performance Evaluation of Para-virtualization on Modern Mobile Phone Platform", In Proceedings of the International Conference on Computer, Electrical, and Systems Science, and Engineering, Nov. 24, 2010, 8 pages.
Zielinski, Dave, "Bring Your Own Devices", In HR Magazine, vol. 57, No. 2, Feb. 2012, 14 pages.
International Search Report and Written Opinion, International Application No. PCT/US2016/036271, Aug. 9, 2016, 12 pages.
Zhauniarovich et al., "MOSES: Supporting and Enforcing Security Profiles on Smartphones," IEEE Transactions on Dependable and Secure Computing, vol. 11, No. 3, May 1, 2014, pp. 211-223.
International Preliminary Report on Patentability, International Application No. PCT/US2016/036271, 16 pages, Nov. 3, 2016.

* cited by examiner

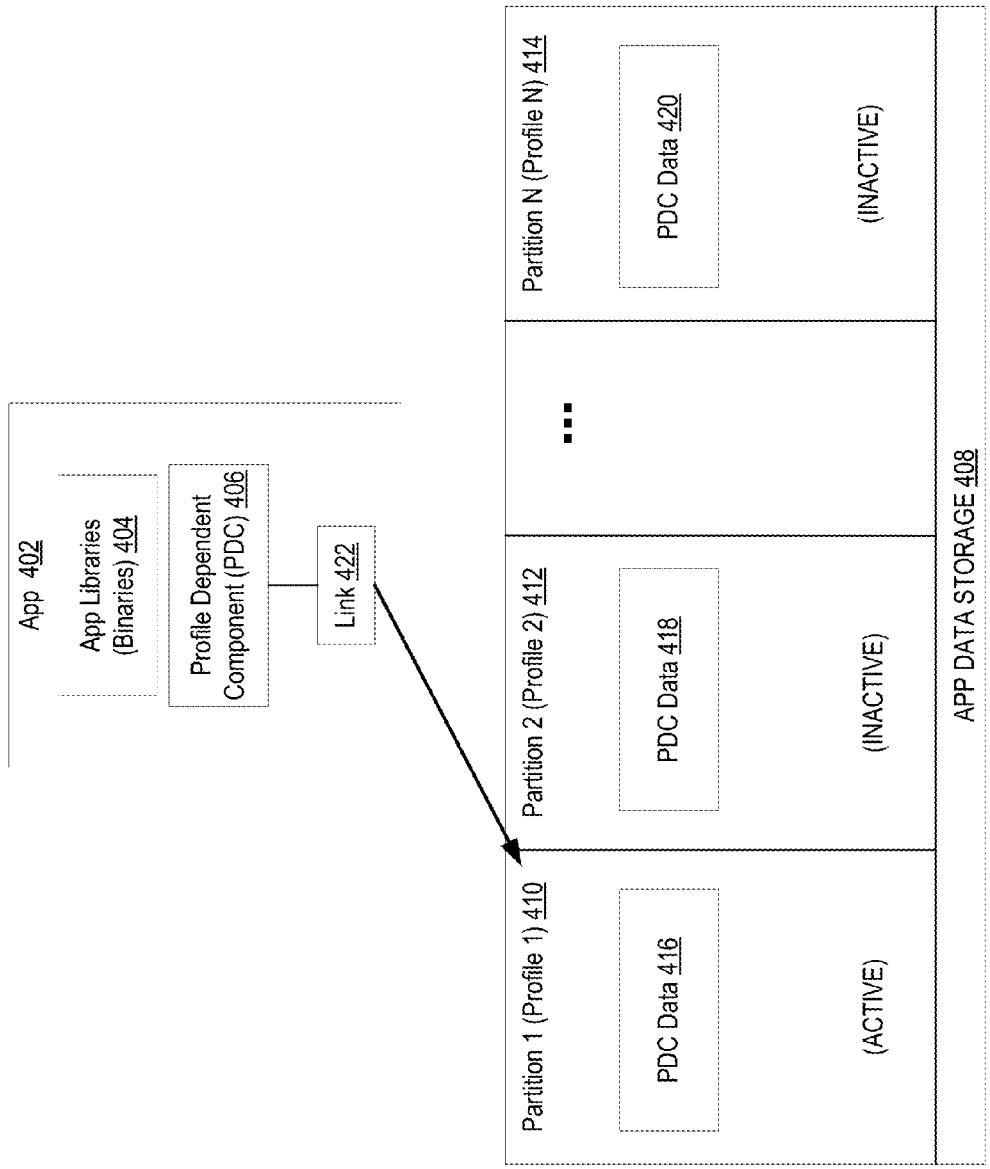

Fig. 5

```xml
<profile name="work">
  <packages>
    <approved name="com.google.android.gm"/>
    <approved name="com.mobisystems.office"/>
  </packages>
  <policy>
    <sensor name="failed-login" maxOccurs="5"/>
    <actuator name="wipe-profile"/>
  </policy>
</profile>
<profile name="personal">
  <packages>
    <approved name="com.facebook.katana"/>
    <approved name="com.google.android.gm"/>
  </packages>
  <policy>
    <sensor name="access-resource" value="TYPE_ACCELEROMETER"/>
    <actuator name="block-access"/>
  </policy>
</profile>
```

502

504

SYSTEM AND METHOD FOR USING PER-APPLICATION PROFILES IN A COMPUTING DEVICE

BACKGROUND

At least some time spent on mobile devices is spent using applications (or "apps"). Some known applications are isolated programs that display content as a set of pages that a user can interact with and navigate between. The functionality of at least some known applications is limited to displaying content expressly requested by the user, and the functionality provided by the application may be, for example, associated with work and/or personal tasks.

"Bring your own device," or BYOD, is the situation in which employers allow their employees to use their own personal devices, particularly smartphones and tablets, for work purposes. BYOD brings significant benefits to both the company and employees, including reduced equipment costs, improved employee engagement, and the convenience of carrying one dual-use device rather than a dedicated phone for each activity. Unfortunately, by using the same device for both work and personal activities, the user and the employer expose themselves to potential security and privacy risks. A company's data is now stored and transmitted using devices and networks that the employer may not control. Applications (apps) on the phone may not all be controlled by the company and, in fact, could be untrustworthy or even malicious.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a computing device may include a processing unit (e.g., 152), a memory storing a plurality of applications (apps) (e.g., memory 150 storing one or more of the applications in the application space 102), a storage (e.g., 162) of the computing device, and an input/output (I/O) subsystem (e.g., 154) configured to receive input designating at least a first profile policy and a second profile policy. The processing unit of the computing device may be configured to perform operations for creating and managing per-application profiles. For example, the processing unit 152 may be used to implement one or more components of the profile management service 126. The processor may be configured to receive input designating at least a first profile policy and a second profile policy. At least a first application profile and a second application profile can be created based on the received first profile policy and the second profile policy, where an application of the plurality of applications is associated with both the first application profile and the second application profile. The processor may create a first storage partition and a second storage partition within a storage space of the storage, the storage space associated with the application. The first storage partition stores application data while the application is running under the first application profile. The second storage partition stores application data while the application is running under the second application profile.

In accordance with one or more aspects, a method for creating and managing per-application profiles may include receiving a plurality of profile policies, each profile policy designating at least one rule associated with using at least one of a plurality of applications (apps) available at the computing device. A plurality of application profiles are created, each application profile associated with a corresponding one of the plurality of profile policies and one or more of the plurality of applications authorized to run under the application profile. For an application of the plurality of applications associated with at least a first application profile and a second application profile of the plurality of application profiles, storing within an application storage space of the application, a single copy of at least one binary component of the application. The at least one binary component can be used for executing the application. A first storage partition associated with the first application profile and a second storage partition associated with the second application profile are created. The first and second storage partitions can be created within the application storage space. Application data is stored in one of the first storage partition or the second storage partition based on an active application profile for the application.

In accordance with one or more aspects, a computer-readable storage medium may store computer-executable instructions for causing a computing device to perform operations for creating and managing per-application profiles. The operations can include receiving input designating a plurality of application profiles for one or more of a plurality of available applications. A plurality of storage partitions are created within a storage space of the computing device. The storage space is associated with an application of a plurality of available applications. Each of the plurality of storage partitions is associated with a corresponding application profile of the plurality of application profiles. While executing the application under a first application profile of the plurality of application profiles, a request from the application to access a second application of the plurality of applications is detected. A response to the access request is generated based on an active profile associated with the second application.

As described herein, a variety of other features and advantages can be incorporated into the technologies as desired.

BRIEF DESCRIPTION OF THE DRAWINGS

FIG. 4 is a schematic diagram illustrating example storage partitions used by an application when running under different application profiles, in accordance with one or more embodiments.

FIG. 5 is a schematic diagram illustrating example profile specifications for a work profile and a personal profile, in accordance with one or more embodiments.

DETAILED DESCRIPTION

Employers increasingly allow employees to use their personal smartphones for work, but also impose strict security policies (e.g., wiping the device after a series of failed logins), which on one hand protects the corporation's data but on the other hand can affect a user's privacy and control of their own data. To address these issues, virtualization techniques may be used for securely partitioning work and personal data. Yet, virtualization has limitations. First, unless heavily optimized, virtualization has a significant overhead on resource-constrained phones. Second, virtualization may constrain applications to be in the same partition at a given time, while users may like having a mix of work and personal applications running on the device simultaneously.

In accordance with techniques described herein, a profile management service may be used to create and manage per-application profiles for a computing device. The profile management service allows users to switch a single application from one active profile (e.g., work) to another without switching all other applications. The service may include a profile manager (for managing user profiles and storage isolation by, e.g., using storage partitions for profile-dependent data), a cross-profile filter (for preventing applications from leaking data across profiles), and a policy enforcer (for implementing the specifications of the profile policies, by monitoring policy conditions through monitors and enforcing the policies through actuators). From a security perspective, the profile management service allows users to have on the same phone a plurality of application profiles (e.g., a work profile, a personal profile, or another type of profile), isolated and governed by profile-specific policies (i.e., each profile may have its own security and privacy policies; applications and data associated with one profile will not interact within the device itself, with applications and data associated with other profiles). From a functionality perspective, the profile management service can be compatible with existing unmodified applications and may enable at least one user profile that is per-application. Unlike user accounts, per-application profiles let users switch a single application from one active profile to another (e.g., from "work" to "personal") without switching all other applications' active profiles.

Figure 1:
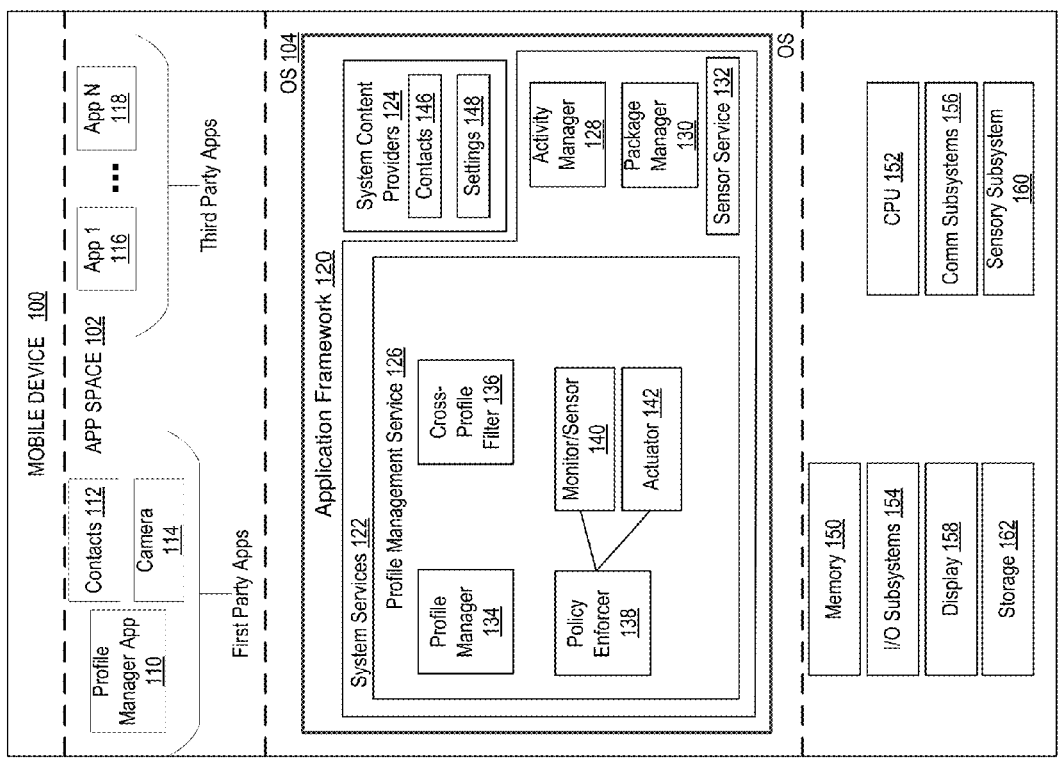
FIG. 1 is a schematic diagram illustrating an exemplary mobile device including one or more applications and a profile management service that may be implemented on the mobile device.

FIG. 1 is a schematic diagram illustrating an exemplary mobile device 100 including one or more applications ("apps") and a profile management service 126 that may be implemented on the mobile device. The mobile device 100 may include any number of applications that enable the mobile device 100 to function as described herein. For example the mobile device 100 may have first-party applications (e.g., applications native to the device) and third-party applications (e.g., applications created by third-parties such as application development companies) installed in the application space 102. The first-party applications may include a profile manager application 110, contacts application 112, camera application 114, and so forth. The third-party applications may include applications 116, . . . , 118, which can be social networking applications, music streaming service applications, news applications, mail applications, and so forth.

The operating system (OS) 104 may include an application framework 120 with system services 122 and system content providers 124. The system content providers 124 may include contacts 146 and settings 148. The system services 122 may include the profile management service 126, an activity manager 128, a package manager 130, and sensor service 132.

The profile management service 126 may comprise suitable circuitry, interfaces, logic and/or code and may be operable to provide functionalities associated with creating and managing per-application profiles. More specifically, the service 126 may include a profile manager 134, a cross-profile filter 136, and a policy enforcer 138. One or more of the functionalities performed by the profile management service 126 (e.g., creating new profiles, editing profiles, switching profiles for a given application, and so forth) may be implemented in a stand-alone application, such as the profile manager application 110.

The profile manager 134 may comprise suitable circuitry, interfaces, logic and/or code and may be used for managing user profiles and storage isolation by, e.g., using storage partitions for profile-dependent data, as explained herein below in reference to "Profile Partitions". The profile manager 134 can be used to create and edit per-application profiles, as well as switch the application profiles for a given application.

The cross-profile filter 136 may comprise suitable circuitry, interfaces, logic and/or code and may be operable to prevent applications from leaking data across profiles, as explained herein below in reference to "Cross-Profile Isolation".

The policy enforcer 138 may comprise suitable circuitry, interfaces, logic and/or code and may be used for implementing the specifications of the profile policies, by monitoring one or more policy conditions through monitors/sensors 140 as well as enforcing the policies through actuators 142 (additional disclosure is provided herein below in reference to "Policy Specification and Enforcement").

The main processor 152 may comprise suitable logic, circuitry, interfaces, and/or code that may be operable to process data, and/or control and/or manage operations of the computing device 100, and/or tasks and/or applications performed therein in connection with functionalities related to creating, managing and use of per-application profiles. In this regard, the main processor 152 may be operable to configure and/or control operations of various components and/or subsystems of the computing device 100 by utilizing, for example, one or more control signals. The main processor 152 enables running and/or execution of applications, programs and/or code, which may be stored, for example, in the system memory 150. In some instances, one or more of the applications running and/or executing on the computing device 100 (e.g., the applications 110, . . . , 118) may generate and/or update video content that may be rendered via the display 158.

The system memory 150 may comprise suitable logic, circuitry, interfaces, and/or code that may enable permanent and/or non-permanent storage, buffering, and/or fetching of data, code and/or other information, which may be used, consumed, and/or processed. In this regard, the system memory 150 may comprise different memory technologies, including, for example, read-only memory (ROM), random access memory (RAM), Flash memory, solid-state drive (SSD), and/or field-programmable gate array (FPGA). The system memory 150 may store, for example, configuration data, which may comprise parameters and/or code, comprising software and/or firmware.

The communication subsystem 156 may comprise suitable logic, circuitry, interfaces, and/or code operable to communicate data from and/or to the computing device 100, such as via one or more wired and/or wireless connections. The communication subsystem 156 may be configured to support one or more wired protocols (e.g., Ethernet standards, MOCA, etc.) and/or wireless protocols or interfaces (e.g., CDMA, WCDMA, TDMA, GSM, GPRS, UMTS, EDGE, EGPRS, OFDM, TD-SCDMA, HSDPA, LTE, WiMAX, WiFi, BLUETOOTH, and/or any other available wireless protocol/interface), facilitating transmission and/or reception of signals to and/or from the computing device 100, and/or processing of transmitted or received signals in accordance with applicable wired or wireless protocols. In this regard, signal processing operations may comprise filtering, amplification, analog-to-digital conversion and/or digital-to-analog conversion, up-conversion/down-conversion of baseband signals, encoding/decoding, encryption/decryption, and/or modulation/demodulation.

The sensory subsystem 160 may comprise suitable logic, circuitry, interfaces, and/or code for obtaining and/or generating sensory information, which may relate to the computing device 100, its user(s), and/or its environment. For example, the sensory subsystems 160 may comprise positional or locational sensors (e.g., GPS or other GNSS based sensors), ambient conditions (e.g., temperature, humidity, or light) sensors, and/or motion related sensors (e.g., accelerometer, gyroscope, pedometers, and/or altimeters).

The I/O subsystem 154 may comprise suitable logic, circuitry, interfaces, and/or code for enabling user interactions with the device 100, enabling obtaining input from user(s) and/or to providing output to the user(s). The I/O subsystem 154 may support various types of inputs and/or outputs, including, for example, video, audio, and/or textual. In this regard, dedicated I/O devices and/or components, external to or integrated within the computing device 100, may be utilized for inputting and/or outputting data during operations of the I/O subsystem 154. Exemplary I/O devices may comprise one or more built-in cameras (e.g., front-facing and/or rear-facing camera), one or more displays (e.g., display 158), mice, keyboards, touchscreens, voice input interfaces, and other input/output interfaces or devices. With respect to video outputs, the I/O subsystem 154 may be operable to generate and/or process video content, graphics, and/or textual data, and/or generate video frames based thereon for display, via the display 158 for example.

The display 158 may comprise suitable logic, circuitry, interfaces and/or code that may enable displaying of video content, which may be handled and/or processed via the I/O subsystem 154.

The tangible storage 162 may be removable or non-removable, and includes magnetic disks, magnetic tapes or cassettes, CD-ROMs, DVDs, or any other medium which can be used to store information and which can be accessed within the computing device 100. The storage 162 can store one or more instructions for the profile management service 126, implementing one or more innovations described herein.

Figure 2:
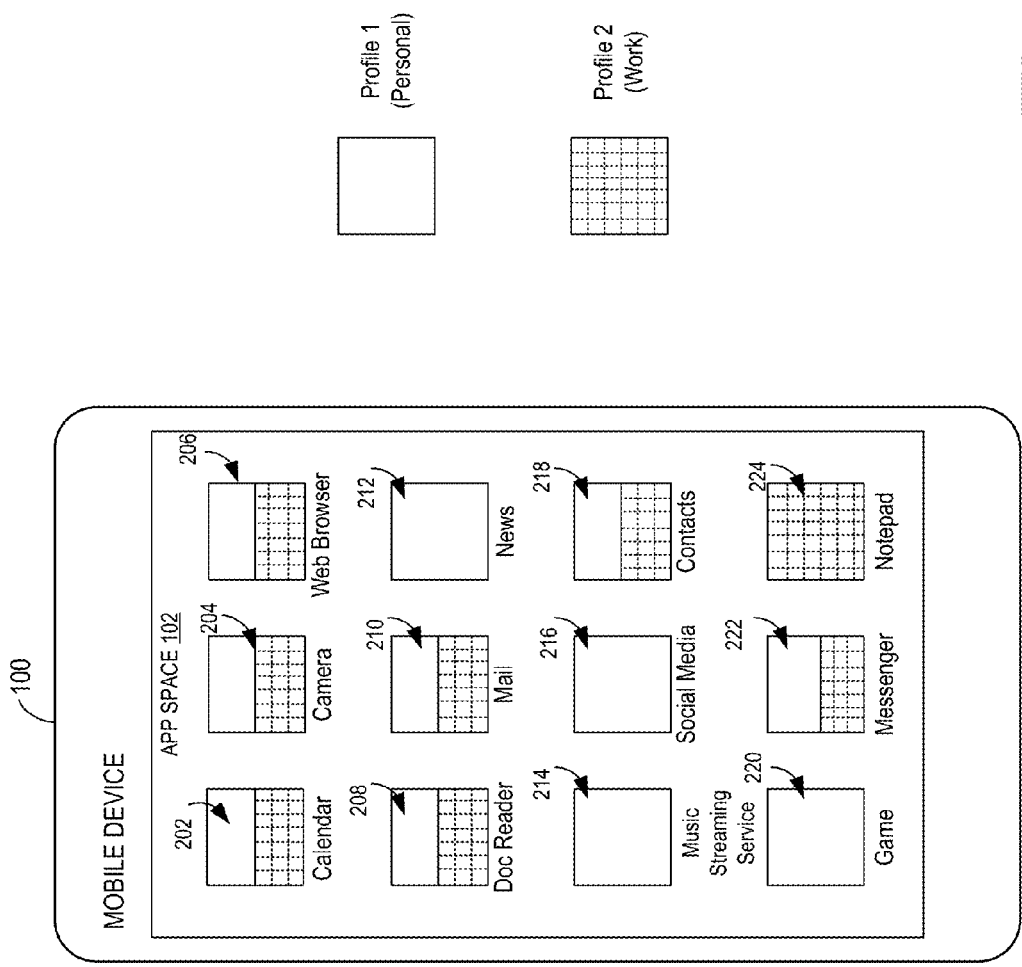
FIG. 2 is a schematic diagram illustrating example applications, which can be executed using various per-application profiles.

FIG. 2 is a schematic diagram illustrating example applications, which can be executed using various per-application profiles. Referring to FIG. 2, there are illustrated a plurality of applications 202, . . . , 224, which can be installed in the application space 102 of device 100. While maintaining a single copy of the applications in the application space 102, each of the applications may be executed (and may run) under one or more application profiles (e.g., a first profile for personal-related use and a second profile for work-related use are illustrated in FIG. 2). The selection of the profile may be performed on a per-application basis so that multiple applications can be executed and run under different profiles at any given time. Even though only two profiles are illustrated in FIG. 2, the present disclosure may not be limited in this regard and multiple profiles (e.g., more than two) may be available for use with each application.

Per-Application Profiles.

Figure 3:
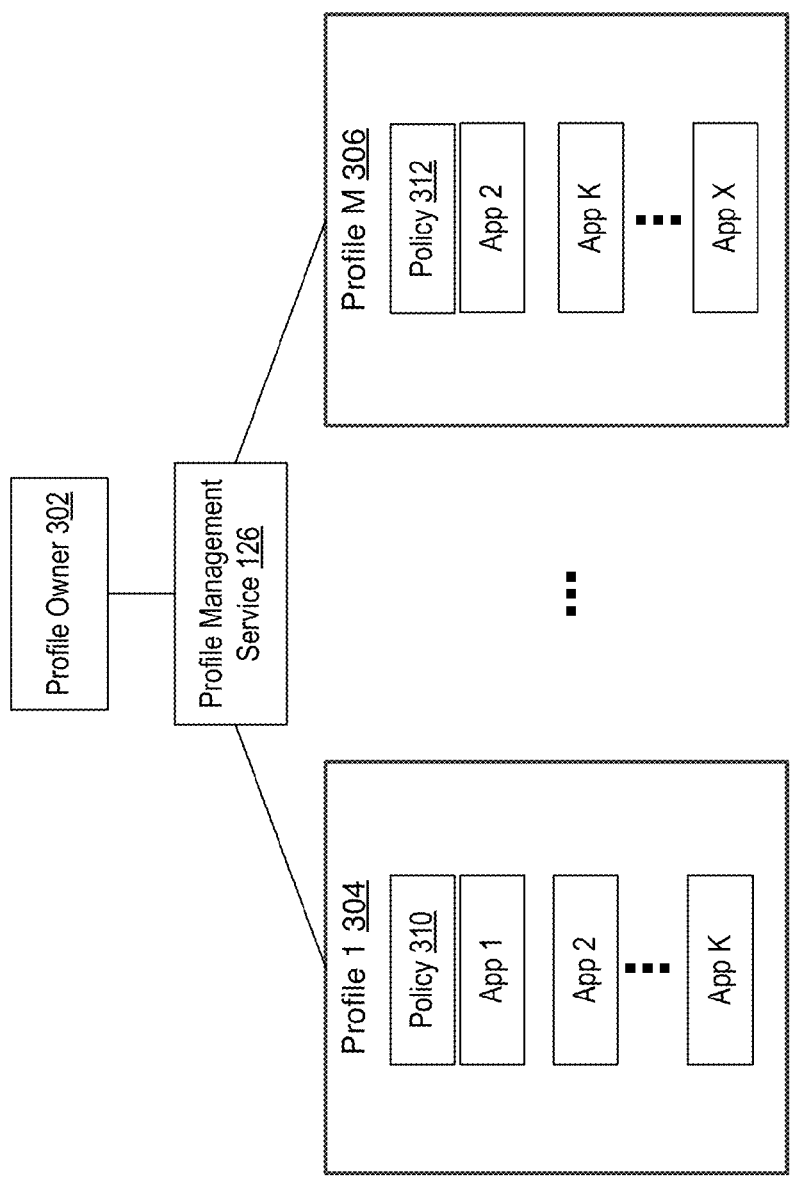
FIG. 3 is a schematic diagram illustrating example application profiles used by the profile management service of FIG. 1.

FIG. 3 is a schematic diagram illustrating example application profiles used by the profile management service of FIG. 1. Referring to FIG. 3, a profile owner 302 may use the profile management service 126 to create and manage one or more application profiles 304, . . . , 306. A profile (e.g., 304, . . . , 306) may include a policy (e.g., 310, . . . , 312) and a set of applications that are allowed to run under the profile. For example, applications 1, 2, . . . , K are allowed to run under application profile 304, and applications 2, K, . . . , X are allowed to run under application profile 306.

As seen in FIG. 3, an application can be associated with multiple profiles. The application profiles used by the profile management service 126 are different from user accounts because they are activated/deactivated on a per-application basis. The profile owner 302 can determine the policy and the set of applications allowed in each profile associated with the owner. The profile management service 126 may store the profile-related information in the file system of device 100 (access to the profile information may be restricted to system processes). A profile owner 302 may be the owner of the device or an external actor, such as an employer in connection with work-related applications. In the latter case, the employer determines the policy and provides a list of pre-approved applications that the device owner can selectively install. A profile owner may approve applications for that profile, and the profile management service 126 may monitor policy compliance (e.g., using the policy enforcer 138) within the scope of that profile. In some embodiments, a profile's policy applies to the applications in that profile. For instance, the work policy (e.g., for the notepad application 224 in FIG. 2) may wipe work-related data after a certain number of consecutive failed logins. Each time a user changes an application's active profile, the profile management service 126 may check whether the application is currently running and, if so, stops the application and all associated background processes. The profile management service 126 may then switch the application's profile so that the application is started in the new profile.

Profile Partitions.

FIG. 4 is a schematic diagram illustrating example storage partitions used by an application when running under different application profiles, in accordance with one or more embodiments. Referring to FIG. 4, the profile management service 126 may maintain a separate storage partition for each application profile, ensuring that data of that profile is stored in that partition and is not accessible to other profiles of the same application and/or to other profiles of a different application.

For an example application 402, a single copy of the executable portion of the application (e.g., the application libraries or binaries 404) may be stored in the application space for the application (e.g., in a directory or file folder) or a separate folder associated with the application. When the application is running (e.g., the binaries 404 are executed), one or more profile-dependent components (such as PDC 406) may be used. The PDC 406 may be components of the application that can generate/use data associated with a certain profile. The profile-specific data used by a PDC 406 can be stored in the application data storage space 408. The storage space 408 can be part of the application framework 120, the application space 102, and/or storage 162. In accordance with one or more embodiments, the application data storage space 408 is partitioned into a plurality of partitions 410, . . . , 414, based on the number of application profiles (1, . . . , N) that the application 402 is authorized to use. More specifically, profile-dependent component data 416 can be generated and/or used when profile 1 is active, PDC data 418 is used when profile 2 is active and so forth. Each of the partitions 1, . . . , N can be implemented as directories or folders in the device file system, with each directory/folder having separate access permissions.

In accordance with one or more embodiments, PDC data for a given profile is stored in the appropriate partition and a link (e.g., 422) can be stored with the application binaries 404 (e.g., in a main folder/directory of the application 402). The link 422 can be a symbolic link and can designate the directory/folder for the partition associated with the currently active profile. In the specific example of FIG. 4, profile 1 is active for the application 402 (all other profiles are inactive) and the link 422 points to the folder/directory associated with partition 410. Partitions can also be enforced using namespace virtualization or union file systems.

The following disclosure relates to profile partitions and cross-profile isolation when the device 100 is running under the Android operating system.

Application data files in the internal storage of device 100 are by default private to the application 402, and such application data files are stored at the path /data/data/<packagename>. To distinguish from the application data, Android application package (APK) files and Dalvik Executable (DEX) files are stored in different directories from the application data (e.g., APK files are stored in /data/app and DEX files are stored in /data/dalvik-cache folders). When the application 402 is first installed, the profile management service 126 creates a partition for a "default" profile by moving the content of the application's original folder to /data/data/<packagename>-default and creating a symbolic link with a path of /data/data/<packagename> pointing to this folder. The application 402 can be added to, for example, both "work" and "personal" application profiles. The first time the application is switched into one of the profiles, the profile management service 126 creates a storage partition for each profile (e.g., 410 and 412), at location /data/data/<packagename>-work if the profile is "work", or /data/data/<packagename>-personal if the profile is "personal". These newly created folders have the same structure as the "default" profile's folder, except that profile management service 126 creates symbolic links in them to point to the "default" library subfolder located at /data/datakpackagename>-default/lib, which contains the application's precompiled libraries (e.g., 404). In some embodiments when symbolic links are used, the lib folder may not be replicated, which minimizes storage overhead.

When the user starts or switches the application 402 into a given profile, the profile management service 126 creates a symbolic link (e.g., 422) in the original application folder /data/data/<packagename> pointing to the partition of the active profile. The file system permissions are set so that the folder of the active profile is accessible by processes with the application's identification (uid), while folders containing inactive profiles have system permissions (e.g., android.uid.system permissions). In this regard, an approved application running in profile "personal" cannot maliciously access files within the "work" partition, even if it is aware of the symbolic link switch. This approach provides isolation for all file system operations, which includes applications' SQLite databases, since they are stored in the same application-specific folders.

In another embodiment, a copy-on-write approach can be used, in which symbolic links are maintained for previously unmodified or static files resident in their application's original folder. Files are copied into the appropriate partition if a write is scheduled from any of the profiles. This solution, however, increases the implementation complexity and potentially the processing overhead, as it requires keeping track of all write operations.

Android applications with the READ EXTERNAL STORAGE or WRITE EXTERNAL STORAGE permissions can read or write files in external storage (the SD card). Files saved in external storage are world-readable, so accessible to any application with such permissions. In an example embodiment, isolation for the external storage may be provided based on at least two observations. First, as per Android guidelines, external storage offers minimal protection for stored data, hence applications should not store sensitive data here, but instead in the application-private directories which can be effectively protected. Second, starting with Android 4.4, external storage is structured like internal storage, with package-specific directories such that applications can access their private partitions (e.g., /sdcard/Android/data/<packagename>) without holding the broad EXTERNAL STORAGE permission. In this regard, applications can comply with the above guideline of using application-specific directories on external storage. The profile management service 126 can use a partitioning approach similar to that of internal storage, except that symbolic links cannot be created in external storage due to the vfat partition. Hence, at a profile switch, the profile management service 126 may change the name of the resident folder, /sdcard/Android/data/<packagename>, used in the previous profile to either /sdcard/Android/data/<packagename>-work or /sdcard/Android/data/<packagename>-personal, depending on the profile. The profile management service 126 may (or may not) isolate profile data stored in shared public directories on external storage, such as Music, Pictures, and Ringtones. Since these directories can be essential for some applications (e.g., to avoid a huge storage overhead or to simplify their syncing strategy), the profile management service 126 can allow them. The profile management service 126 can also monitor and log how an application uses external storage and whether one or more communication channels associated with using a given profile try to access or export data to another profile of the same or a different application.

Cross-Profile Isolation.

The profile management service 126 can be used to isolate profiles within an application as well as isolate profiles between applications. The Android OS may be used to isolate applications from each other by running them with separate Linux user identifiers (UIDs), and restricts their access to system resources and other applications by requiring that they request specific permissions at installation time. Further, an application's files may be stored in a private folder accessible to that application (unless the application's UID is shared with other applications). Thus, the Android OS can be used to provide a level of isolation. However, there may be other ways in which cross-profile communication can occur, such as explicit communication channels and side channels.

Explicit communication channels. Android applications can share data via several communication channels, such as inter-component communication (ICC) and external storage. The ICC can include direct intents, broadcast intents, and content providers.

Inter-Component Communication (ICC). Android applications can include components, including Activities, Services, Content Providers and Broadcast Receivers. Components can communicate via direct intents, broadcast intents, and content providers.

Direct intents. One Activity or Service can launch another using a direct Android Intent. Intents can be used for task delegation, e.g., a Mail application can use an Intent to launch Acrobat Reader to open an attachment. The direct intents can also be used to set up communication sessions between components, i.e., by binding to a Service, which can expose an AIDL (Android Interface Definition Language) interface.

Broadcast intents. Applications may also send and receive Broadcast Intents. Broadcasts may originate from the system (e.g., notifying the device's screen is off) or from applications, and they are delivered to each registered receiver.

Content providers. Content providers handle shared sets of data like SMSs or contacts. Applications can use built-in content providers or expose their own custom content providers. Two applications (or two profiles of the same application) can communicate by one writing to a content provider and the other reading from it.

External storage. Applications can share data by writing to world-readable locations on external storage (e.g., an SD card). Prior to Android 4.4, all files on external storage were accessible to any application with the READ EXTERNAL STORAGE permission. Starting with Android 4.4, external storage is structured like internal storage, using application-specific directories accessible to that application. However, applications can still share data via the SD card through public shared directories (Music, Pictures, etc.).

Linux IPC. Applications can also communicate via standard Linux inter-process communication methods. Android offers Java APIs for Linux IPC (android.os.MemoryFile and android.net.LocalSocket) in addition to native Linux IPC.

Side-channel capability. Android System Services, such as Sensor Service, WiFi Manager or Audio Manager, can be used as covert channels. In addition, sensors can be used by an application to acquire information about another application.

Network. In addition, applications can also communicate using the network, via a private or public server or cloud infrastructure.

In accordance with one or more embodiments, the profile management service 126 may be used to analyze possible cross-profile communication channels available for a given application. More specifically, static and dynamic analysis may be automatically performed on an application's binary in order to identify whether and how the application uses all channels described above. The profile management service 126 may detect the use of both explicit communication channels and side-channels (it may exclude the network channel). The static analysis may involve processing every method call site and looking for the presence of Java APIs related to system services, Java bindings to Linux IPC, built-in content providers, custom content providers, access to SD card, and sensor services. The profile management service 126 may report whether an application shares the same UID with any application of a given set of applications, implying the application's data is shared with those applications. For dynamic analysis, a given application may be executed and a kernel mode tracer can be used to trace calls to APIs for exchange and broadcast of intents, file system accesses to external storage, and Linux IPC attempts (sockets, pipes and Android custom shared memory). The kernel mode tracer may be context-sensitive, i.e. the tracer may detect when the application is executing its own native code, and may switch on tracing automatically (this may reduce Linux IPC false positives arising from support libraries).

In accordance with one or more embodiments, the profile management service 126 may prevent cross-profile leakage of data by blocking one or more of the following explicit communication channels: direct intents, broadcast intents, built-in content providers, and external storage access (e.g., application-specific paths for accessing an SD card or other type of external storage). Such channels can be blocked without requiring changes to the applications and without the applications noticing it (i.e., in a transparent way).

Direct intents. Android applications are allowed to start other applications or services through respective calls to either startActivity or startService(bindService). Additionally, Android allows applications to delegate tasks to other applications through calls to startActivityForResult. These features are facilitated by Android's Intent class. While useful, these features pose security and privacy risks at odds with cross-profile isolation performed by the profile management service 126. For example, a Book Catalogue application may delegate scanning of barcodes to a Barcode Scanner application. If Book Catalogue runs under one profile, it may leak information to the Barcode Scanner, which might maintain a record of all scanned barcodes irrespective of Book Catalogue's current profile.

In another example scenario, a user runs a Mail application and AcrobatReader, both allowed in work and personal profiles. The Mail application may delegate opening an attachment to AcrobatReader, currently running in the other profile. To prevent data leakage across profiles, at least four options can be implemented at the system level and be performed by the profile management service 126: (1) The calling application cannot arbitrarily force another application to switch its current profile, so it has to wait for a timeout to expire or for the needed application to end; (2) the calling application has the right to force the called application to switch profile such that it can be used immediately; (3) the called application switches profile after the user is prompted with a dialog and approves the switch; (4) the request of the calling application is rejected and a SecurityException is thrown or a friendlier failed status is returned to the calling application.

The first three options can lead to a denial-of-service attack: a malicious application running in the background may continuously invoke AcrobatReader and prevent other profiles from using the application. Even in the case of the third option, the user, unaware of what is happening, may keep approving the profile switch. Another drawback of the second approach is that it is not immediately clear what profile should be given precedence, and a drawback of the third approach is that dialogs are disruptive to users. For these reasons, this class of conflict can be resolved by taking the applications' semantics into account. In fact, whether the profile switch should be automatically authorized depends on how trusted the applications are (e.g., first-party applications may be able to force a switch) and on the type of task (e.g., another application for viewing PDF files may be available for use instead). A solution may be based on the fourth approach described above, in which the calling application receives a SecurityException thrown by the profile management service 126 from within the startActivityLocked member function of the ActivityStack class. This approach builds on the assumption that applications that delegate tasks to other applications should already be prepared to handle such exceptions, in the event that the needed application is unavailable. For unresolved intents that result in Android's "chooser" activity, the onCreate and rebuildList functions of the ResolverActivity and ResolveListAdapter classes respectively may be modified, to display applications approved under the active profile of the intent creator.

The profile management service 126 may also ensure that application components cannot bind to services running under different profiles, with the exception of critical system services (e.g., Location Manager, Account Manager, Power Manager). This is implemented by intercepting calls to startServiceLocked and bindService of ActivityManagerService, where requests to start or bind to services across profiles are denied.

Broadcast intents. Android applications may also send broadcast intents, which are delivered to all subscribed receivers (possibly subject to a predefined permission). Cross-profile data leakage can happen if a trusted application in one profile sends sensitive information to receivers in applications under a different profile. A data leak can even occur through subscriber registration because upon successful registration, the last available sticky broadcast is automatically sent to the new broadcast receiver. The profile management service 126 resolves this potential threat by filtering out registered or registering receivers with active profiles that are different from the one of the sending application. More specifically, the broadcastIntentLocked and registerReceiver member functions of the ActivityManagerService class can be modified accordingly.

Content providers. Android applications can also share data through built-in and custom content providers. For built-in content providers like the Contacts provider, the profile management service 126 can enforce a logical partition of the provider's database. Specifically, the getDatabaseLocked API of the SQLiteOpenHelper class can be modified to fork and control access to the appropriate databases for each profile. At a profile switch, the profile management service 126 forces a switch of the database to the one belonging to the active profile, for any database function specified in the ContentProvider class. For custom content providers, a different approach can be used since the corresponding ContentProvider classes may be difficult to modify (e.g., there may be a requirement of supporting unmodified applications). In this instance, the profile management service 126 may check whether the calling application and the owner of the custom content provider are within the same profile (e.g., by instrumenting the acquireProvider and acquireExistingProvider APIs of the ActivityThread class). If they belong to different profiles, a null reference is returned. Otherwise, the requested provider is returned. This solution provides isolation at the cost of making custom providers available in one profile at the time.

Policy Specification and Enforcement

FIG. 5 is a schematic diagram illustrating example profile specifications for a work profile and a personal profile, in accordance with one or more embodiments. The various per-application profiles may be specified in, e.g., XML and stored on the device 100. The profiles may or may not be encrypted.

FIG. 5 illustrates a template that can be used and extended as more policy constructors are introduced. Each profile specification (e.g., work profile 502 and personal profile 504) can include two parts: a list of packages approved for use under that profile and a policy. Each policy can include one or more conditions to be monitored and one or more actions to be executed if those conditions are detected. FIG. 5 shows an example of a "work" and of a "personal" profile (502, 504). The "work" policy specifies that after five consecutive failed logins, data belonging to that profile must be wiped; the "personal" policy specifies that applications requesting the TYPE ACCELEROMETER resource should be denied access. Each time the phone boots or new profiles are created, the policy specifications are parsed. The map of all supported applications approved under a profile is stored in memory, and each policy is translated into subscriptions to policy monitors. As an example, below is a description of the monitors and actuators that can be implemented for the policies in FIG. 5.

For the "work" policy of profile 502, a Password Monitor can be implemented, which keeps track of incorrect password entries. The reportFailedPasswordAttempt( ) method of the DevicePolicyManagerService class can be modified to send a sticky broadcast with information about the number of incorrect password entries each time a wrong password is entered. If the maximum number of wrong attempts is reached, the Wipe O__ Actuator is invoked to erase all profile data. Once the profile is deleted, a notification is sent to the other AppFork modules and application to reflect the changes.

For the "personal" policy of profile 504, a Blacklisted Resources Monitor can be implemented, which can keep track of applications' requests for device resources, particularly sensors like proximity or accelerometers, which could lead to side-channel attacks. The ContextImpl, SensorManager and SystemSensorManager classes can be modified to monitor application's access to device sensors. If access is requested, the Resource Block Actuator grants or denies access depending on the policy. For simplicity, if access has to be denied it filters out the application's subscriptions for sensor readings. This approach may prevent applications from crashing as opposed to if their requests were rejected. As another implementation, the sensor readings could be returned but in an obfuscated or generalized manner. The Policy Enforcer module may be designed in a modular fashion to ease addition of new monitors and actuators. Additional monitors can cover important contextual information, such as home or work location, battery level, or WiFi network information. Additional actuators can provide a richer set of actions, such as blocking network traffic, switching network radio, and backing up data to the cloud. Example policies can include "If at work and using the corporate WiFi network, use the cellular network for transmitting personal data" or "Block applications from communicating with blacklisted network domains".

Figure 6:
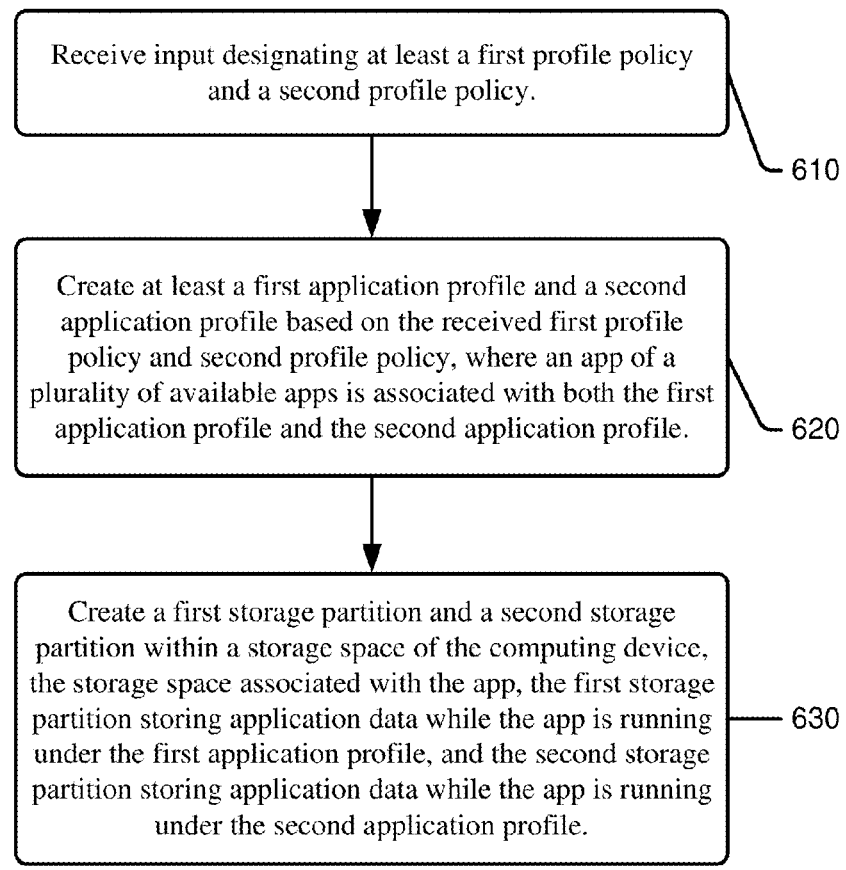
FIGS. 6-8 are flow diagrams illustrating example methods for creating and managing per-application profiles, in accordance with one or more embodiments.
Figure 7:
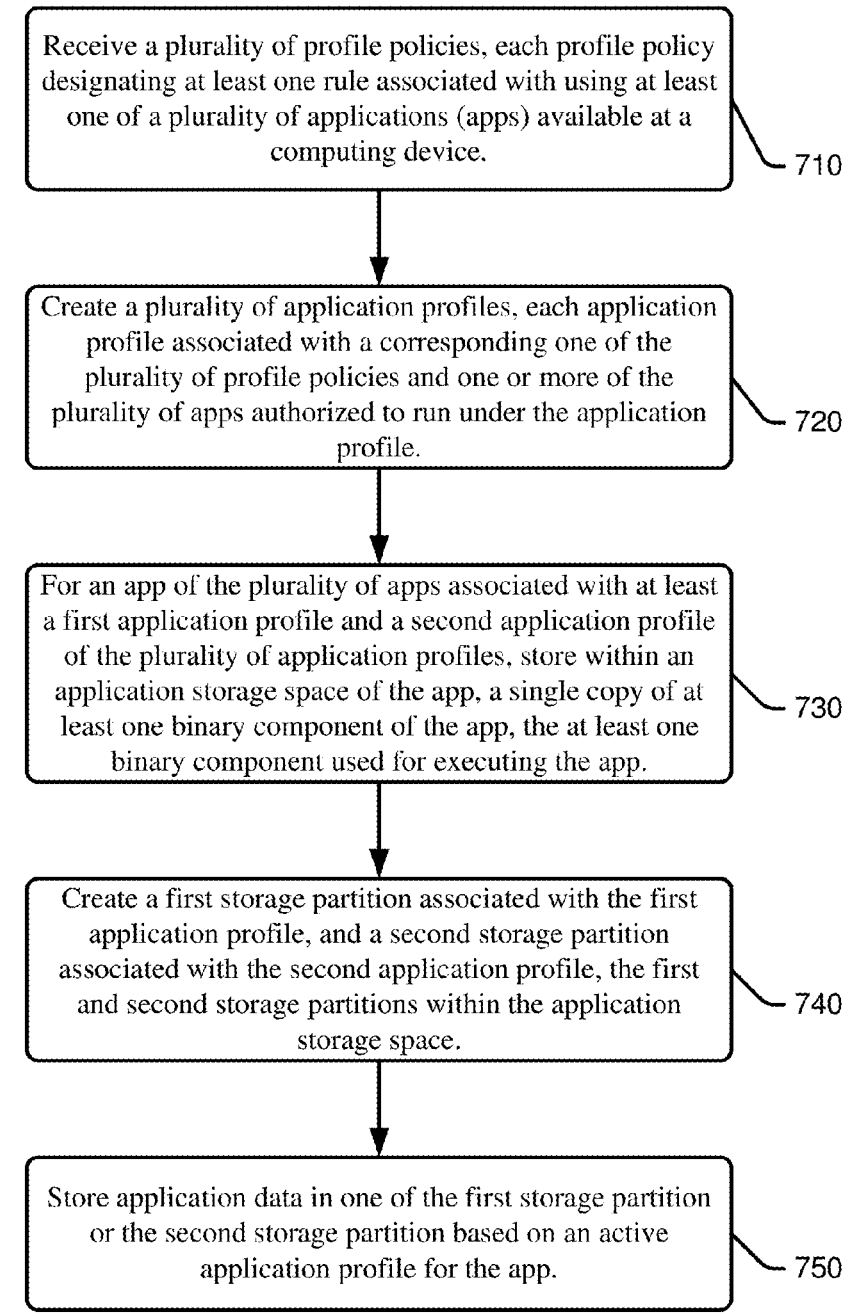
Figure 8:
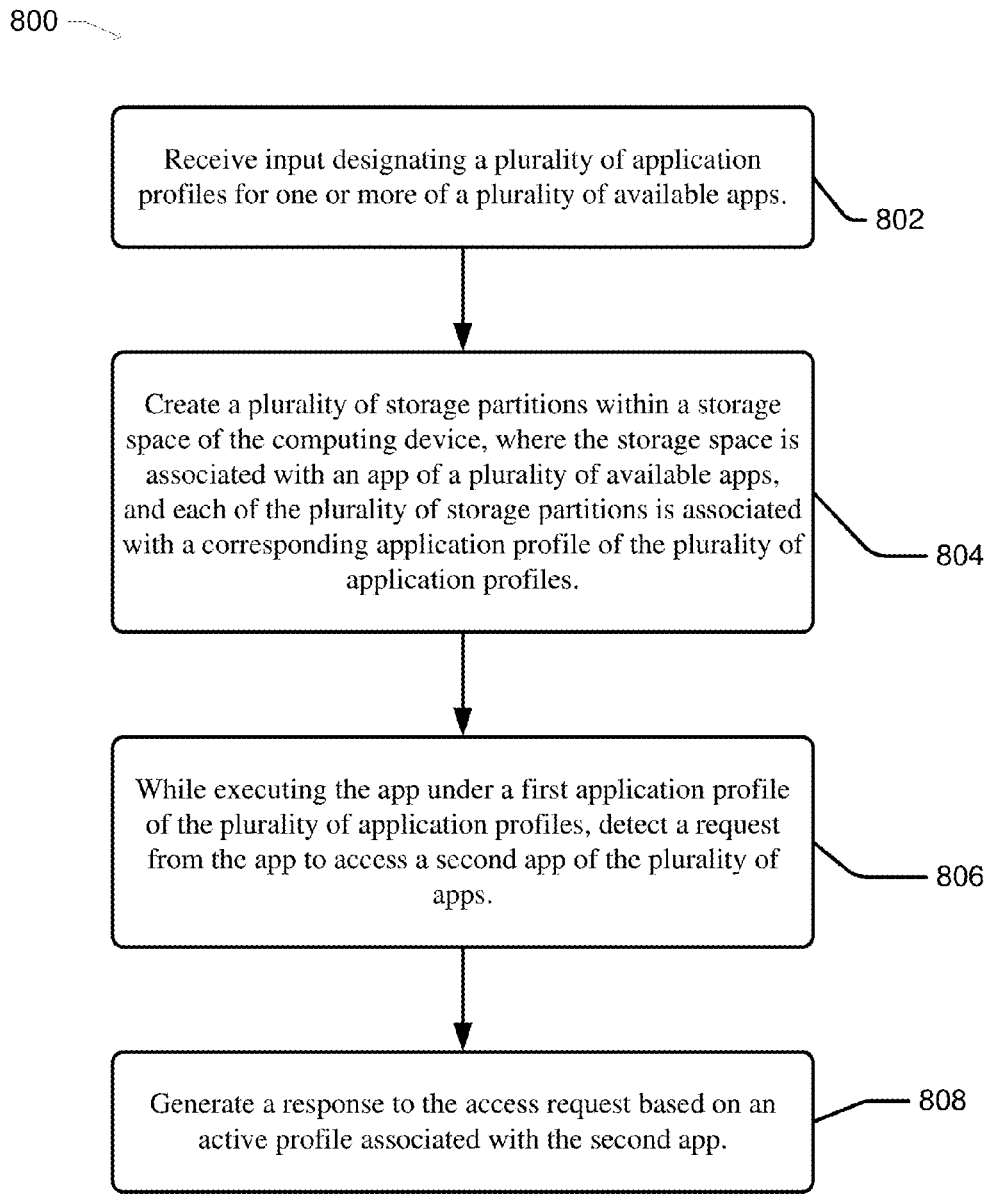

FIGS. 6-8 are flow diagrams illustrating example methods for creating and managing per-application profiles, in accordance with one or more embodiments. Referring to FIGS. 1-4 and 6, the example method 600 may start at 610, when input designating at least a first profile policy and a second profile policy can be received. For example, the input may be performed by using the profile manager application 110 and can be used to enter the policies 310, 312). At 620, at least a first application profile (e.g., 304 or profile 1 in FIG. 4) and a second application profile (e.g., 306 or profile 2 in FIG. 4) can be created based on the received first profile policy and the second profile policy. An application (e.g., 402) of the plurality of applications is associated with both the first application profile and the second application profile. At 630, a first storage partition and a second storage partition can be created within a storage space of the computing device, the storage space associated with the application. For example, partitions 410 and 412 can be created within the storage space 408 associated with application 402. The first storage partition 410 stores application data (e.g., 416) while the application is running under the first application profile. The second storage partition (e.g., 412) stores application data while the application is running under the second application profile.

Referring to FIGS. 1-4 and 7, the example method 700 may start at 710, when a plurality of profile policies can be received (e.g., policies 310, . . . , 312). Each profile policy may designate at least one rule associated with using at least one of a plurality of applications (e.g., applications 110, . . . , 118) available at the computing device 100. At 720, a plurality of application profiles can be created (e.g., 304, . . . , 306). Each application profile can be associated with a corresponding one of the plurality of profile policies and one or more of the plurality of applications authorized to run under the application profile. At 730, for an application (e.g., 402) of the plurality of applications associated with at least a first application profile and a second application profile (e.g., profiles 1-2 in FIG. 4) of the plurality of application profiles, the following may be performed by the profile management service 126: a single copy of at least one binary component of the application (e.g., binaries 404) may be stored within an application storage space of the application 402. The at least one binary component (404) may be used for executing the application 402. At 740, a first storage partition (410) associated with the first application profile and a second storage partition (412) associated with the second application profile can be created. The first and second storage partitions can be located within the application storage space (e.g., 408). At 750, application data (e.g., 416, 418) can be stored in one of the first storage partition or the second storage partition based on an active application profile for the application (e.g., if profile 1 is active, profile-dependent component data 416 is stored in partition 410).

Referring to FIGS. 1-4 and 8, the example method 800 may start at 802, when input designating a plurality of application profiles (e.g., profiles 1, . . . , N in FIG. 4) for one or more of a plurality of available applications may be received. At 804, a plurality of storage partitions (e.g., 410, . . . , 414) may be created within a storage space (e.g., 408) of the computing device. The storage space 408 may be associated with an application (402) of a plurality of available applications. Each of the plurality of storage partitions (410, . . . , 414) may be associated with a corresponding application profile of the plurality of application profiles (e.g., profiles 1, . . . , N in FIG. 4). At 806, while executing the application (e.g., 402) under a first application profile (e.g., 410) of the plurality of application profiles, a request from the application to access a second application of the plurality of applications may be detected. At 808, a response to the access request may be generated based on an active profile associated with the second application. For example, the profile management service 126 may allow communication between applications if both applications are running under the same profile. In instances when both applications are running under the same profile (e.g., work profile), then communication between the applications can be allowed, otherwise denied.

Figure 9:
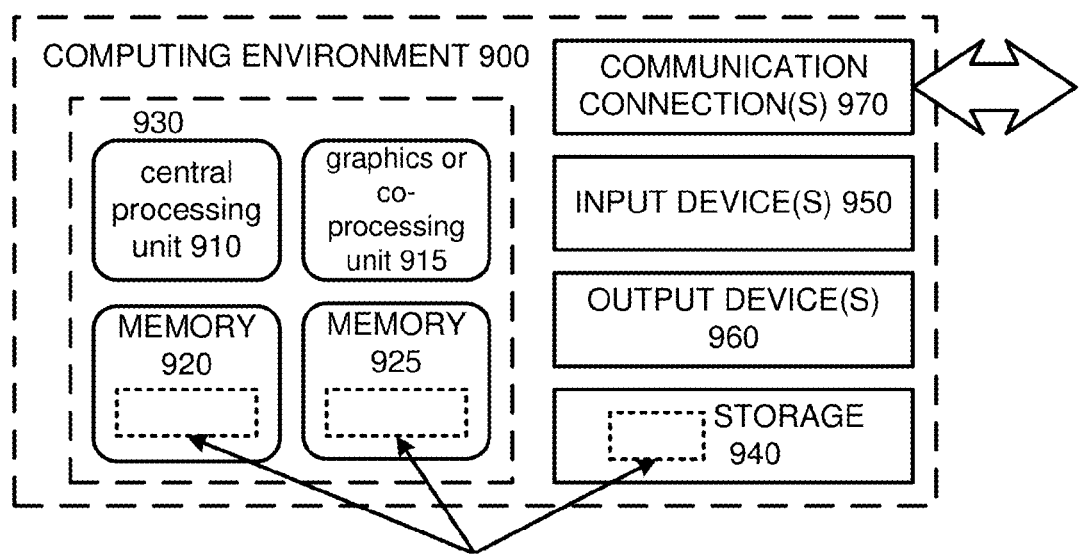
FIG. 9 is a diagram of an example computing system, in which some described embodiments can be implemented.

FIG. 9 is a diagram of an example computing system, in which some described embodiments can be implemented. The computing system 900 is not intended to suggest any limitation as to scope of use or functionality, as the innovations may be implemented in diverse general-purpose or special-purpose computing systems.

With reference to FIG. 9, the computing system 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s).

A computing system may also have additional features. For example, the computing system 900 includes storage 940, one or more input devices 950, one or more output devices 960, and one or more communication connections 970. An interconnection mechanism (not shown) such as a bus, controller, or network interconnects the components of the computing system 900. Typically, operating system software (not shown) provides an operating environment for other software executing in the computing system 900, and coordinates activities of the components of the computing system 900.

The tangible storage 940 may be removable or non-removable, and includes magnetic disks, magnetic tapes or cassettes, CD-ROMs, DVDs, or any other medium which can be used to store information and which can be accessed within the computing system 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing system 900. For video encoding, the input device(s) 950 may be a camera, video card, TV tuner card, or similar device that accepts video input in analog or digital form, or a CD-ROM or CD-RW that reads video samples into the computing system 900. The output device(s) 960 may be a display, printer, speaker, CD-writer, or another device that provides output from the computing system 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Figure 10:
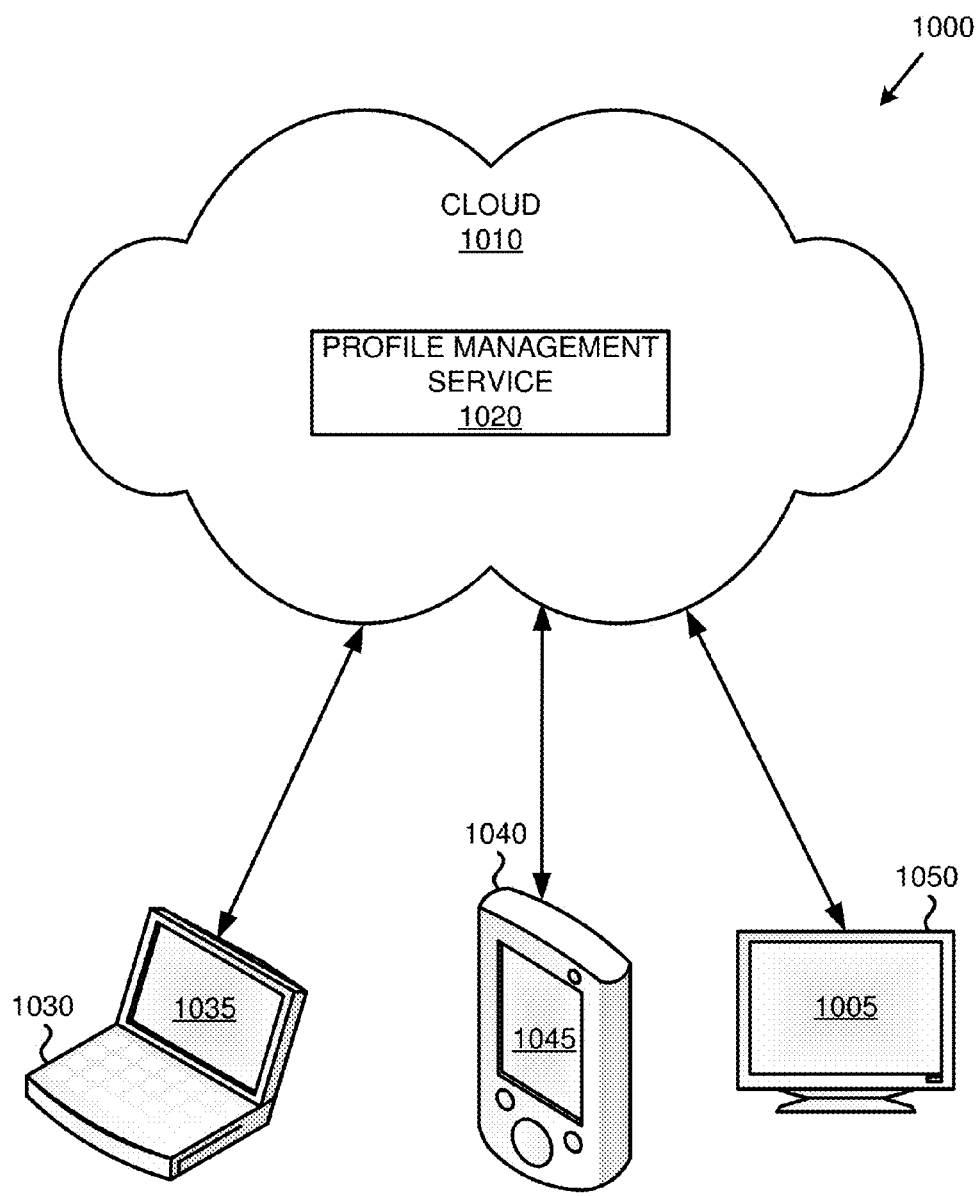
FIG. 10 illustrates a generalized example of a suitable cloud-supported environment, in which described embodiments, techniques, and technologies may be implemented.

FIG. 10 illustrates a generalized example of a suitable cloud-supported environment 1000, in which described embodiments, techniques, and technologies may be implemented. In the example environment 1000, various types of services (e.g., computing services) are provided by a cloud 1010. For example, the cloud 1010 can comprise a collection of computing devices, which may be located centrally or distributed, that provide cloud-based services to various types of users and devices connected via a network such as the Internet. The implementation environment 1000 can be used in different ways to accomplish computing tasks. For example, some tasks (e.g., processing user input and presenting a user interface) can be performed on local computing devices (e.g., connected devices 1030, 1040, 1050), while other tasks (e.g., storage of data to be used in subsequent processing) can be performed in the cloud 1010.

In example environment 1000, the cloud 1010 provides services for connected devices 1030, 1040, 1050 with a variety of screen capabilities. Connected device 1030 represents a device with a computer screen 1035 (e.g., a mid-size screen). For example, connected device 1030 could be a personal computer such as desktop computer, laptop, notebook, netbook, or the like. Connected device 1040 represents a device with a mobile device screen 1045 (e.g., a small size screen). For example, connected device 1040 could be a mobile phone, smart phone, personal digital assistant, tablet computer, and the like. Connected device 1050 represents a device with a large screen 1055. For example, connected device 1050 could be a television screen (e.g., a smart television) or another device connected to a television (e.g., a set-top box or gaming console) or the like.

One or more of the connected devices 1030, 1040, and/or 1050 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1000. For example, the cloud 1010 can provide services for one or more computers (e.g., server computers) without displays.

Services related to creating and managing per-application profiles can be provided by the cloud 1010 through the profile management service 1020. The service 1020 may have functionalities similar to the profile management service 126 as described herein.

In the example environment 1000, the cloud 1010 provides one or more of the technologies and solutions described herein to the various connected devices 1030, 1040, and/or 1050 using, at least in part, the profile management service 1020.

Figure 11:
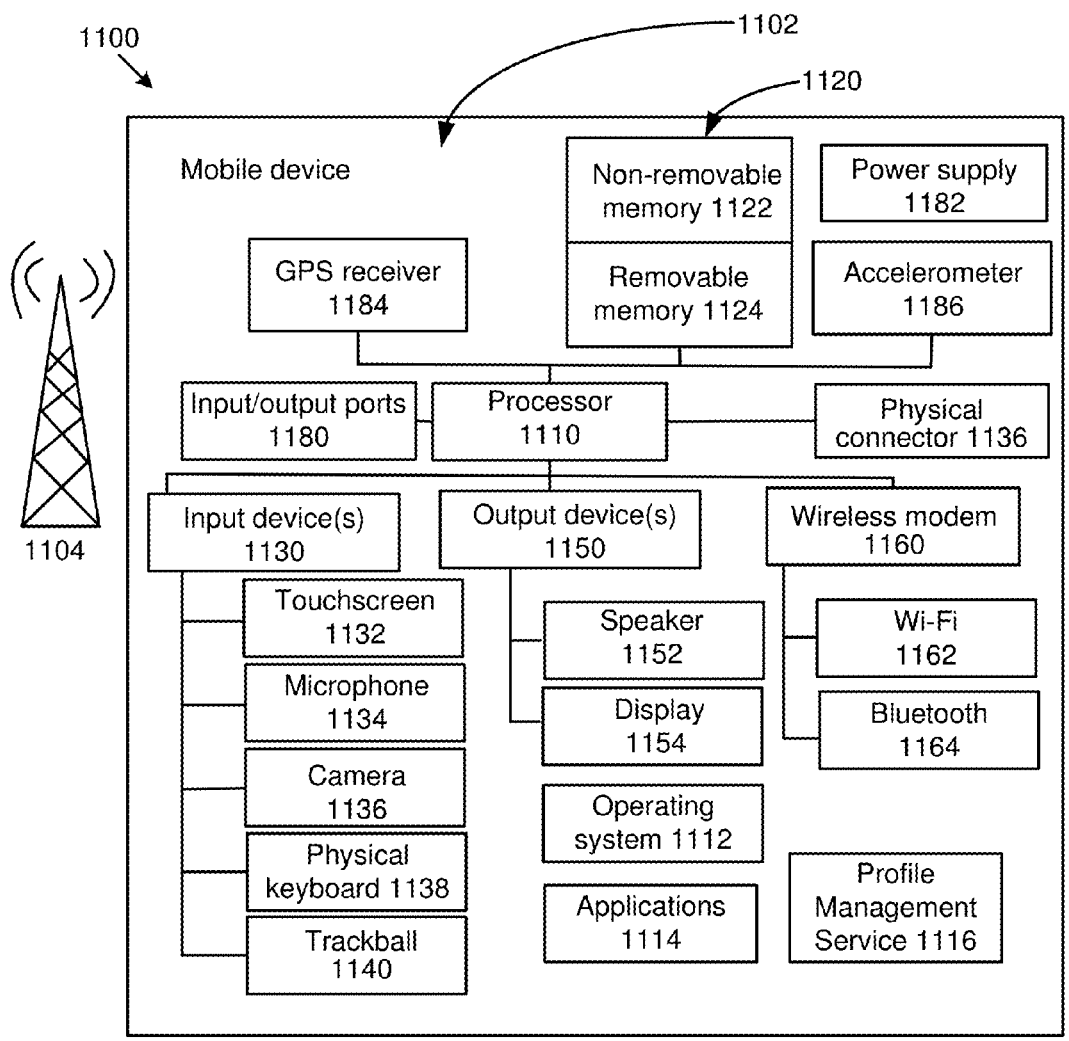
FIG. 11 is an example mobile device that can be used in conjunction with the technologies described herein.

FIG. 11 is an example mobile device that can be used in conjunction with the technologies described herein. Referring to FIG. 11, the example mobile device 1100 may include a variety of optional hardware and software components, shown generally at 1102. Any components 1102 in the mobile device 1100 can communicate with any other component, although not all connections are shown, for ease of illustration. The mobile device 1100 can be any of a variety of computing devices (e.g., cell phone, smartphone, handheld computer, Personal Digital Assistant (PDA), etc.) and can allow wireless two-way communications with one or more mobile communications networks 1104, such as a cellular, satellite, or other network.

The illustrated mobile device 1100 can include a controller or processor 1110 (e.g., signal processor, microprocessor, ASIC, or other control and processing logic circuitry) for performing such tasks as signal coding, data processing, input/output processing, power control, and/or other functions. An operating system 1112 can control the allocation and usage of the components 1102 and support for one or more application programs 1114. The application programs can include common mobile computing applications (e.g., email applications, calendars, contact managers, web browsers, messaging applications), or any other computing application.

The illustrated mobile device 1100 can include memory 1120. Memory 1120 can include non-removable memory 1122 and/or removable memory 1124. The non-removable memory 1122 can include RAM, ROM, flash memory, a hard disk, or other well-known memory storage technologies. The removable memory 1124 can include flash memory or a Subscriber Identity Module (SIM) card, which is well known in GSM communication systems, or other well-known memory storage technologies, such as "smart cards." The memory 1120 can be used for storing data and/or code for running the operating system 1112 and the applications 1114. Example data can include web pages, text, images, sound files, video data, or other data sets to be sent to and/or received from one or more network servers or other devices via one or more wired or wireless networks. The memory 1120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 1100 can support one or more input devices 1130, such as a touchscreen 1132, microphone 1134, camera 1136, physical keyboard 1138 and/or trackball 1140, and one or more output devices 1150, such as a speaker 1152 and a display 1154. Other possible output devices (not shown) can include piezoelectric or other haptic output devices. Some devices can serve more than one input/output function. For example, touchscreen 1132 and display 1154 can be combined in a single input/output device.

The input devices 1130 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 1112 or applications 1114 can comprise speech-recognition software as part of a voice user interface that allows a user to operate the device 1100 via voice commands. Further, the device 1100 can comprise input devices and software that allows for user interaction via a user's spatial gestures, such as detecting and interpreting gestures to provide input to a gaming application.

A wireless modem 1160 can be coupled to an antenna (not shown) and can support two-way communications between the processor 1110 and external devices, as is well understood in the art. The modem 1160 is shown generically and can include a cellular modem for communicating with the mobile communication network 1104 and/or other radio-based modems (e.g., BLUETOOTH 1164 or Wi-Fi 1162). The wireless modem 1160 is typically configured for communication with one or more cellular networks, such as a GSM network for data and voice communications within a single cellular network, between cellular networks, or between the mobile device and a public switched telephone network (PSTN).

The mobile device can further include at least one input/output port 1180, a power supply 1182, a satellite navigation system receiver 1184, such as a Global Positioning System (GPS) receiver, an accelerometer 1186, and/or a physical connector 1190, which can be a USB port, IEEE 1194 (FireWire) port, and/or RS-232 port. The illustrated components 1102 are not required or all-inclusive, as any components can be deleted and other components can be added.

In an example embodiment of the disclosure, the mobile device 1100 may further include a profile management service 1116, which may be separate from (e.g., a stand-alone application) or implemented as part of the operating system 1112, the applications 1114, and/or the device processor 1110. The profile management service 1116 may have functionalities similar to the profile management service 126, as described herein.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 9, computer-readable storage media include memory 920 and 925, and storage 940. By way of example and with reference to FIG. 11, computer-readable storage media may include memory and storage 1120, 1122, and 1124. The term "computer-readable storage media" does not include signals and carrier waves. In addition, the term "computer-readable storage media" does not include communication connections (e.g., 970, 1160, 1162, and 1164).

In accordance with an example embodiment of the disclosure, a method may include tracking one or more geo-fences using a GNSS (e.g., GPS) hardware processor within a computing device. The tracking may use at least one GNSS (e.g., GPS) signal. State changes of the one or more geo-fences during the tracking may be saved in a shared state database. The shared state database may be shared between the GNSS hardware processor and an application processor within the computing device. Upon detecting a deterioration of the at least one GNSS signal, tracking the one or more geo-fences using the GNSS hardware processor may be switched to tracking the one or more geo-fences using the application processor. After the switching, an initial state of each of the one or more geo-fences may be set using states currently stored in the shared state database prior to the switching.

In accordance with another example embodiment of the disclosure, a computing device may include a GNSS (e.g., GPS) hardware processor configured to track one or more geo-fences using at least one GNSS (e.g., GPS) signal; an application processor configured to take over tracking the one or more geo-fences upon deterioration of the at least one GNSS signal; and a shared state database configured to store state changes of the one or more geo-fences during the tracking. The shared state database may be shared between the GNSS hardware processor and the application processor. Upon switching from tracking the one or more geo-fences using the GNSS hardware processor to tracking the one or more geo-fences using the application processor, the application processor may be operable to set an initial state of each of the one or more geo-fences using states currently stored in the shared state database prior to the switching. Upon detecting an improvement of the at least one GNSS signal, tracking the one or more geo-fences using the application processor may be switched to tracking the one or more geo-fences using the GNSS hardware processor. After the switching back, an initial state of each of the one or more geo-fences may be set using the states currently stored in the shared state database prior to the switching back.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing device, comprising:
   a processing unit;
   a memory storing a plurality of applications;
   a storage of the computing device; and
   an input/output (I/O) subsystem configured to receive input designating at least a first profile policy and a second profile policy;
   wherein the processing unit is configured to:
      create at least a first application profile and a second application profile based on the received first profile policy and the second profile policy, wherein an application of the plurality of applications is associated with both the first application profile and the second application profile;
      store within an application storage space associated with the application, a single copy of at least one binary component of the application, the at least one binary component used for executing the application;
      create a first storage partition and a second storage partition within the storage space associated with the application, wherein:
         the first storage partition stores application data while the application is running under the first application profile; and
         the second storage partition stores application data while the application is running under the second application profile;
      execute and run the application under the first application profile;
      while the application is running under the first application profile, limit access to one or more device sensors disapproved by the first profile policy associated with the first application profile, the limiting access comprising obfuscating sensor readings from the one or more device sensors while the application is running under the first application profile; and
      while the application is running under the first application profile, execute and run a second application of the plurality of applications under the second application profile, wherein the second application has unrestricted access to the one or more device sensors;
   wherein the first application profile and the second application profile are per-application profiles that are usable on a per-application basis where multiple applications are executed and run under different application profiles at a same time.

2. The computing device of claim 1, wherein the I/O subsystem is further configured to:
   receive a second input designating at least a first portion of the plurality of applications, the first portion of the plurality of applications comprising applications for use with the first application profile.

3. The computing device of claim 2, wherein the second input further designates at least a second portion of the plurality of applications, the second portion of the plurality of applications comprising applications for use with the second application profile.

4. The computing device of claim 1, wherein the input further designates at least a third profile policy for a third application profile, wherein the application is further associated with the third application profile.

5. The computing device of claim 1, wherein the processing unit is further configured to:
   while the application is executing under the first application profile, limit storage space access to the first storage partition; and
   while the application is executing under the second application profile, limit storage space access to the second storage partition.

6. A method, implemented at least in part by a computing device, for creating and managing per-application profiles, the method comprising:
   receiving a plurality of profile policies, each profile policy designating at least one rule associated with using at least one of a plurality of applications (apps) available at the computing device;
   creating a plurality of application profiles, each application profile associated with a corresponding one of the plurality of profile policies and one or more of the plurality of applications authorized to run under the application profile;
   for an application of the plurality of applications associated with at least a first application profile and a second application profile of the plurality of application profiles:
      storing within an application storage space of the application, a single copy of at least one binary component of the application, the at least one binary component used for executing the application;

creating a first storage partition associated with the first application profile, and a second storage partition associated with the second application profile, the first and second storage partitions within the application storage space; and storing application data in one of the first storage partition or the second storage partition based on an active application profile for the application;

executing and running the application under the first application profile;

while the application is running under the first application profile, limiting access to one or more device sensors disapproved by a first profile policy associated with the first application profile, the limiting access comprising obfuscating sensor readings from the one or more device sensors while the application is running under the first application profile; and while the application is running under the first application profile, executing and running a second application of the plurality of applications under the second application profile, wherein the second application has unrestricted access to the one or more device sensors;

wherein the first application profile and the second application profile are per-application profiles that are usable on a per-application basis where multiple applications are executed and run under different application profiles at a same time.

7. The method according to claim 6, wherein the active profile is the first application profile and the method further comprises:

storing the application data in the first storage partition while the application is running under the first application profile.

8. The method according to claim 6, wherein the active profile is the second application profile and the method further comprises:

storing the application data in the second storage partition while the application is running under the second application profile.

9. The method according to claim 6, wherein the at least one binary component comprises application binaries of the application and the method further comprises:

storing a single copy of the unmodified binaries of the application in an application directory separate from the application storage space.

10. The method according to claim 9, further comprising:
storing a link to one of the first storage partition or the second storage partition in the application directory, based on active application profile.

11. The method according to claim 6, further comprising:
restricting access to the first storage partition while the application is running under the second application profile.

12. The method according to claim 6, further comprising:
restricting access to the second storage partition while the application is running under the first application profile.

13. The method according to claim 6, further comprising:
restricting access to at least another application of the plurality of applications, while the application is running under the first application profile and the at least another application is running under the second application profile.

14. A computer-readable storage medium storing computer-executable instructions for causing a computing device to perform operations for creating and managing per-application profiles, the operations comprising:

receiving input designating a plurality of application profiles for one or more of a plurality of available applications;

storing within an application storage space associated with an application of the plurality of available applications, a single copy of at least one binary component of the application, the at least one binary component used for executing the application;

creating a plurality of storage partitions within the storage space associated with the application, wherein:
the storage space is associated with the application of the plurality of available applications; and
each of the plurality of storage partitions is associated with a corresponding application profile of the plurality of application profiles;

while executing and running the application under a first application profile of the plurality of application profiles, detecting a request from the application to access a second application of the plurality of applications;

generating a response to the access request based on an active profile associated with the second application;

while the application is running under the first application profile, limiting access to one or more device sensors disapproved by a first profile policy associated with the first application profile, the limiting access comprising obfuscating sensor readings from the one or more device sensors while the application is running under the first application profile; and while the application is running under the first application profile, executing and running a third application of the plurality of applications under a second application profile, wherein the third application has unrestricted access to the one or more device sensors;

wherein the first application profile and the second application profile are per-application profiles that are usable on a per-application basis where multiple applications are executed and run under different application profiles at a same time.

15. The computer-readable storage medium according to claim 14, the operations further comprising:
denying the access request when the second application is running under an application profile of the plurality of application profiles that is different from the first application profile.

16. The computer-readable storage medium according to claim 14, the operations further comprising:
granting the access request when the second application is running under the first application profile.

17. The computer-readable storage medium according to claim 14, the operations further comprising:
while executing the application under the first application profile, storing application data in a first storage partition of the plurality of storage partitions, the first storage partition associated with the first application profile.

18. The computer-readable storage medium according to claim 17, the operations further comprising:
in response to a request to change the application profile, switching execution of the application from the first application profile to the second application profile of the plurality of application profiles; and
while executing the application under the second application profile, storing application data in a second storage partition of the plurality of storage partitions, the second storage partition associated with the second application profile.

19. The computing device of claim 1, wherein the one or more device sensors are one or more of location sensors, ambient condition sensors, and motion related sensors.

\* \* \* \* \*